United States Patent [19]

Wagai et al.

[11] Patent Number: 4,955,080

[45] Date of Patent: Sep. 4, 1990

[54] SELECTIVELY CALLED RECEIVER

[75] Inventors: Kiyoshi Wagai, Hino; Makoto Murai, Hachioji, both of Japan

[73] Assignee: Kabushiki Kaisha Toshiba, Kawasaki, Japan

[21] Appl. No.: 223,983

[22] Filed: Jul. 25, 1988

[30] Foreign Application Priority Data

Jul. 29, 1987 [JP] Japan .................. 62-189955

[51] Int. Cl.⁵ .............................. H04B 1/16
[52] U.S. Cl. .................... 455/343; 455/228; 340/825.44
[58] Field of Search .............. 455/343, 228, 227, 229, 455/38; 340/825.44, 825.48

[56] References Cited

U.S. PATENT DOCUMENTS

| 4,733,100 | 3/1988 | Nusairat et al. | 455/343 |
| 4,777,655 | 10/1988 | Numata et al. | 455/343 |
| 4,802,240 | 1/1989 | Yamaguchi et al. | 455/228 |

Primary Examiner—Douglas W. Olms
Assistant Examiner—Ralph Smith
Attorney, Agent, or Firm—Finnegan, Henderson, Farabow, Garrett, and Dunner

[57] ABSTRACT

This selectively called receiver intermittently receives a frame signal including call information and transmitted through radio communication from a calling end on a battery saving basis and checks the presence of a call to the receiver. When the call to the receiver is detected, the receiver generates a ringing tone such as a bell sound. While a conventional selectively called receiver usually sets a reference level for proper binarization and reproduction of the frame signal and generates a ringing tone related to battery checking simultaneously, the inventive receiver performs the setting of the reference level and the generation of a ringing tone related to battery checking with different timings in order to stabilize the setting of the reference level.

6 Claims, 6 Drawing Sheets

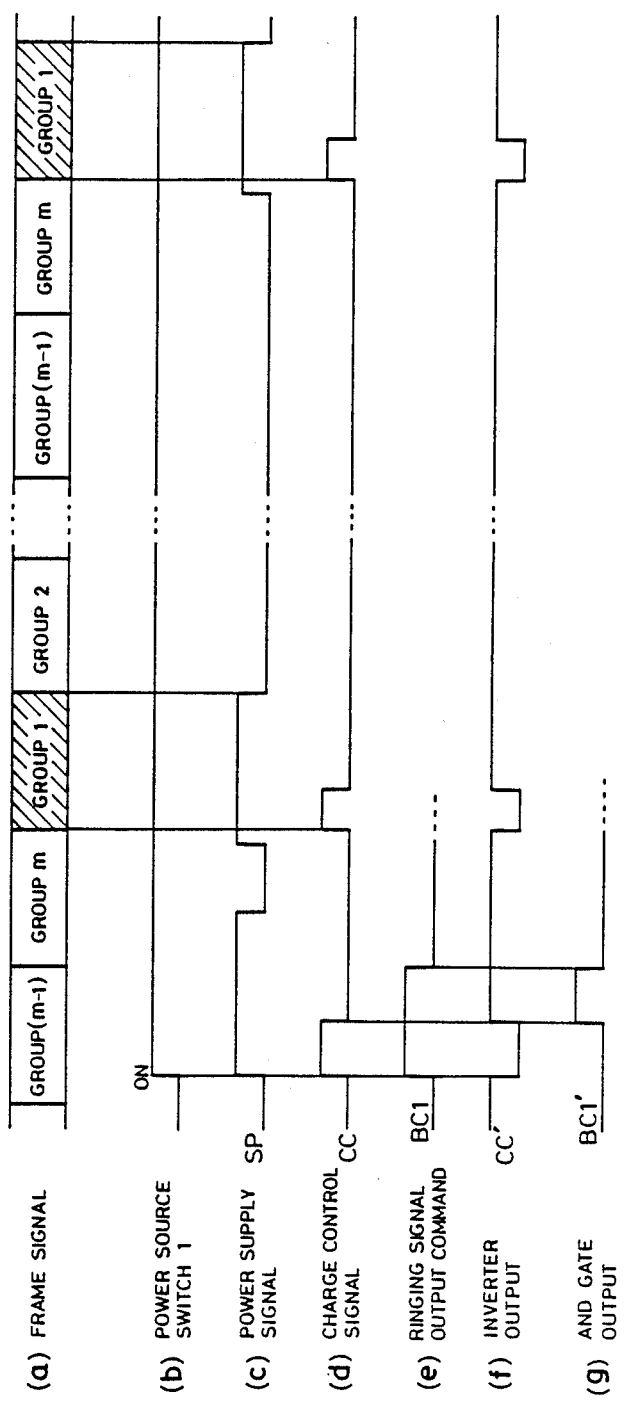

SELECTIVELY CALLED RECEIVER

BACKGROUND OF THE INVENTION

1. Field of the Invention

The present invention relates to selectively called receivers, so-called "pocket bells", which generate a predetermined bell sound in response to a call from a calling end and, more particularly, to improvements to the structure of such receivers which respond to such call with high reliability under whatever conditions.

2. Description of the Prior Art

In order to selectively call such a selectively called receiver to cause same to perform a predetermined ringing operation, a signal sent from a calling transmission end to these selectively called receivers generally has a frame structure shown in FIG. 1.

The transmitted signal includes a one-frame signal transmitted repeatedly at predetermined periods, the signal being time divided into a plurality of "groups" (the number of groups in this example=m), as shown in FIG. 1(a), each group being, in turn, time divided into a "synchronizing word" and a plurality of "call words" (the number of words in this example=n) in the format shown in FIG. 1(b). As shown in FIG. 1(c), the "synchronizing word" includes a "bit synchronizing signal" which includes a predetermined number of bits of alternate logical values "0" and "1" for each bit of the frame signal, and a "group synchronizing signal" which accommodates the appropriate group number of the frame signal as data (symbol).

In the frame signal of FIG. 1, the "call word" is a portion which has an "individual number symbol" corresponding to a respective selectively called receiver, and the "group" is a unit allocated to the frame signal as an element which generally calls any number of selectively called receivers. An individual receiver which a subscriber has necessarily belongs to a respective one of a first to a $m^{th}$ "groups", and has a "call word" allocated thereto corresponding to the "individual number" in the appropriate "group".

Each receiver usually receives intermittently only a signal related to the "group" portion in one frame signal to which that receiver belongs, and checks whether the "call word" indicative of the "individual number" allocated beforehand to that receiver is present in the received signal. When the receiver detects that the "call word" indicative of the "individual number" is present, it performs a ringing operation to inform the appropriate subscriber (the user or owner of the receiver) that there is an incoming call for the subscriber.

The respective "groups" constituting the frame signal appear repeatedly at predetermined periods for each frame. If each receiver can only recognize the contents of the "group synchronizing signal" from the first received signal after the power source is turned on, it can easily realize intermittent reception of only a signal involving the "group" portion to which that receiver belongs in the manner mentioned above after the turning on of the power source in accordance with an appropriate timekeeping operation on the basis of the comparison of the contents of the "group synchronizing signal" with the group to which the receiver belongs.

FIG. 2 illustrates one example of the structure of a receiver conventionally employed generally as a selectively called receiver. As shown in FIG. 2, the receiver includes a power source switch 1, a power source (batteries) 2 which is put under a power supply enable state by turning on the switch 1, a battery saving circuit 3 which mainly controls the power feeding from the power source 2 on the basis of a received signal at the early turning on of the power switch 1 in order to perform an intermittent reception, a symbol memory 4 comprising a non-volatile memory in which a symbol indicative of the number of the "group" to which the receiver belongs and a symbol indicative of the "individual number" of the receiver are beforehand recorded, a receiving antenna 5, a radio circuit 6 which receives and processes the frame signal (see FIG. 1; actually, this frame signal is modulated as required and then transmitted) via the receiving antenna 5, a demodulator 7 which demodulates the received signal properly, a waveform shaping circuit 8 which binarizes the demodulated signal on the basis of a predetermined reference level signal and shapes the result to a pulse signal, a symbol check circuit 9 which compares and checks the logical value structure of the shaped pulse signal with the logical value structure of a symbol indicative of the "individual number" recorded in the code memory 4 and outputs a ringing signal output command BC2 when those logical value structures coincide, a ringing signal forming circuit 10 which forms and outputs a predetermined ringing signal such as the "bell sound" on the basis of application of the ringing signal output command, an amplifier 11 which amplifies the formed ringing signal properly, and a speaker 12 which generates a ringing tone such as a "bell sound" on the basis of the amplified ringing signal.

The operation of the receiver will now be outlined with reference to FIG. 3. Assume that when the frame signal is being transmitted in the format shown in FIG. 3(a), the power source switch 1 is turned on by the subscriber or user with the timing, for example, shown in FIG. 3(b). The battery saving circuit 3 first feeds (supplies a power supply signal SP) simultaneously to all the respective circuits 6–11 to enable the respective circuits to operate. Thus, the frame signal is received via the antenna 5 by the radio circuit 6, demodulated by the demodulator 7, and shaped by the waveform shaping circuit 8 to a pulse signal having the form mentioned above.

The battery saving circuit 3 then extracts the shaped frame signal, searches the "synchronizing word" (see FIG. 1) in the frame signal, compares and checks the "synchronizing word" and a symbol indicative of the "group" number of the receiver recorded in the symbol memory 4 and performs the synchronization of the intermittent reception on the basis of the result of the comparison and check.

The battery saving circuit 3 then supplies the power supply signal SP to the respective circuits 6–11 for a constant time duration at a constant time period on the basis of the form of the resulting synchronization such that only a signal of the "group" portion of the frame signal to which that receiver belongs is received. Generally, in consideration of the start of the operation of the radio circuit 6 and demodulator 7, the timing at which the power supply signal SP is applied is slightly advanced (see FIG. 3(c)).

Each time the intermittent reception is carried out in such manner, the symbol check circuit 9 compares and checks a symbol indicative of the "individual number" in the manner mentioned above. When the coincidence is detected, the symbol check circuit 9 determines that there is an incoming call to that receiver and outputs a ringing tone signal output command BC2 to the ringing tone signal forming circuit 10 which then forms and outputs the ringing signal. This signal is properly amplified by the amplifier 11 and sounded as the ringing tone via the speaker 12.

The waveform shaping circuit 8 which supplies a reproduced version of the frame signal to the battery saving circuit 3 and symbol check circuit 9 determines the binarization of the demodulated output from the demodulator 7 using a predetermined reference level signal, as mentioned above. In order to provide a correct reproduced version of the frame signal, the determination of the binarization is required to be performed with high accuracy, of course.

In order that the reference level signal always has an appropriate value, the waveform shaping circuit 8 uses the "bit synchronizing signal (0, 1, 0, 1, . . . )" of the "synchronizing word" to hold the average value of the demodulated output of the "bit synchronizing signal (0, 1, 0, 1, . . . )" as the reference level signal for the shaping circuit 8 and maintains the held value so as not to fluctuate during other time intervals. As the shaping circuit 8, a circuit such as that illustrated in FIG. 2 is usually used.

As shown in FIG. 2, the shaping circuit 8 basically includes a comparator 81, a capacitor 82, a charge control switch 83, and a resistor 84. The switch 83 is turned on (closed) only during the reception and demodulation of the "bit synchronizing signal" to thereby rapidly charge and discharge the capacitor 82. During the time interval excluding the reception and demodulation of the "bit synchronizing signal", the switch 83 is turned off (opened) to increase the time constant related to the capacitor 82 to thereby suppress to a minimum degree fluctuations of the voltage held by the capacitor 82 which will be the reference level signal. The rapid charge and discharge of the capacitor 82 based on the turning on of the switch 83 is performed only for a time duration in which the hold voltage in the capacitor 82 can be the reference level signal even when the power source switch 1 is turned on. This is so because the contents of the received frame signal are intended to be reproduced accurately even after the power switch is turned on. The turning on/off of the switch 83 are controlled systematically by the battery saving circuit 3. A signal CC shown in FIG. 2 is a charge control signal which controls the turning on and off of the switch 83. The manner in which the charge control signal CC is generated is illustrated in FIG. 3(d). The switch 83 is turned on when the control signal CC is on (when the logical level is high) and is controlled so as to be off during other time intervals.

In the receiver, generally, when the voltage fed by the power source (battery) 2 is maintained higher than a predetermined value which is capable of driving the respective circuits 6–11 when the power source switch 1 is turned on, the receiver informs the subscriber or user, using a ringing tone such as "bell sound", that the receiver is usable. At this time, the battery saving circuit 3 checks the output voltage from the power source 2 on the basis of the turning on of the power source switch 1. If the output voltage is higher than the predetermined value, a ringing tone signal output command BC1 is applied to the ringing tone signal forming circuit 10 to expedite the formation and outputting of the ringing tone signal. FIG. 3(e) shows the manner in which the ringing tone signal output command BC1 is generated.

As just described above, the conventional selectively called receiver simultaneously sets a reference level for the waveform shaping circuit 8 and gives a command for outputting a ringing signal to the ringing tone signal forming circuit 10 when the power source switch is turned on (see FIGS. 3(d) and (e)). Therefore, when the reference level is set, namely, when the capacitor 82 is rapidly charged and discharged, a big current flows through the ringing signal forming circuit 10, amplifier 11 and speaker 12 due to the ringing operation, so that it is difficult to set and maintain the reference level at the appropriate value mentioned above. So long as the reference level is not maintained at the appropriate value, the frame signal cannot be reproduced accurately and, furthermore, a call through the frames signal (or to report to the subscriber), of course, cannot be responded properly.

SUMMARY OF THE INVENTION

The present invention derives from contemplation of the prior art problems. It is an object of the present invention to provide a selectively called receiver which is capable of rapidly adjusting properly the reference level set at the waveform shaping circuit even when the power source is turned on.

In order to achieve this object, according to the present invention, the time when the charge control signal is applied to the waveform shaping circuit is set so as to be different from the time when the ringing tone signal output command is given to the ringing signal forming circuit in order to prevent the rapid charge and discharge operation of the capacitor disposed as reference level signal hold means in the waveform shaping circuit from being performed at the same time as the ringing operation.

Thus, the reference level is rapidly set without being influenced by fluctuations of the power source voltage due to the ringing operation and the contents of a received frame signal are accurately recognized and analysed even immediately after the power source is turned on.

BRIEF DESCRIPTION OF THE DRAWINGS

FIG. 3 is a timing chart showing an illustrative operation of the FIG. 2 receiver performed especially when the power source is turned on.

FIG. 5 is a timing chart showing an illustrative operation of the receiver of FIG. 4 performed especially when the power source is turned on.

FIG. 7 is a timing chart showing an illustrative operation of the receiver shown in FIG. 6 performed especially when the power source is turned on.

DESCRIPTION OF THE PREFERRED EMBODIMENT

Figure 1:
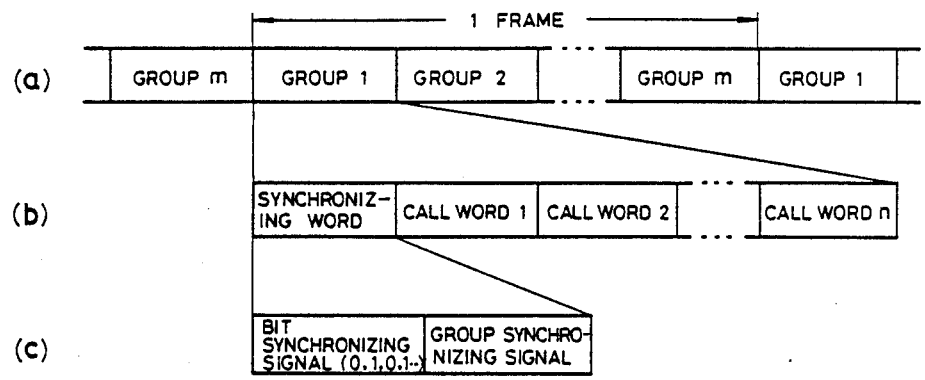
FIG. 1 schematically shows the frame structure of a frame signal transmitted as a call signal to a selectively called receiver.
Figure 2:
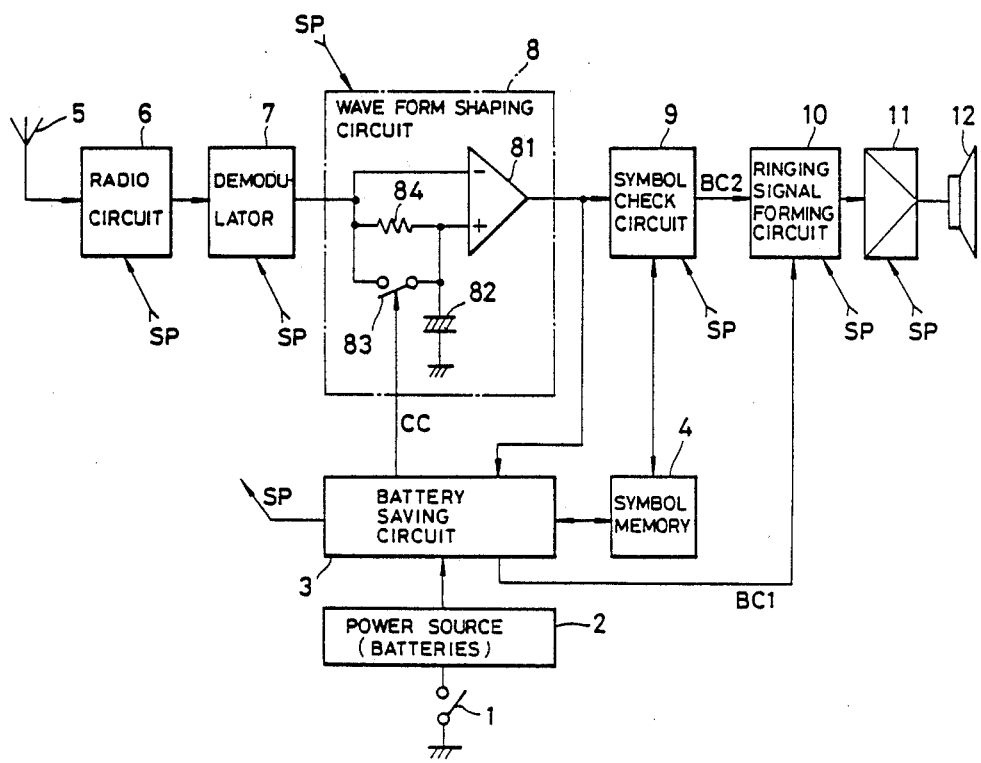
FIG. 2 is a block diagram of a receiver generally employed conventionally as the selectively called receiver.
Figure 4:
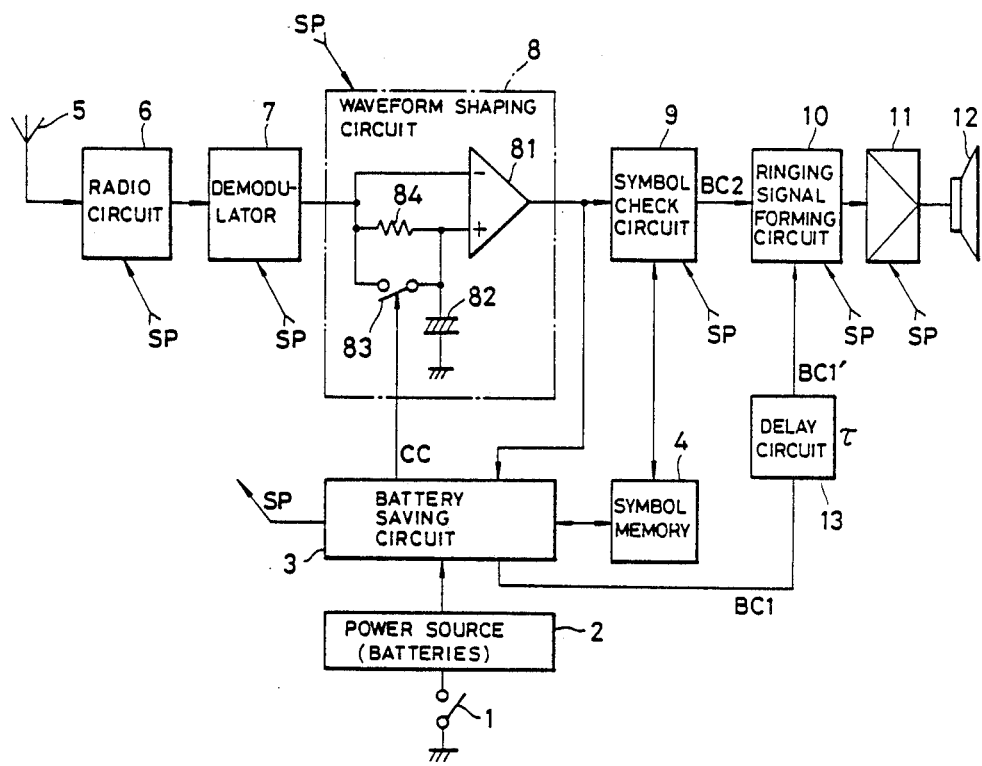
FIG. 4 is a block diagram of one embodiment of a selectively called receiver according to the present invention.

FIG. 4 shows one embodiment of a selectively called receiver according to the present invention. In FIG. 4, the same reference numeral as that used in FIG. 2 is used to identify the same element or circuit as that in FIG. 2 and duplicate description on that circuit or element will be omitted.

As shown in FIG. 4, the receiver of this embodiment further includes a delay circuit 13 which delays by a predetermined time τ the ringing tone signal output command BC1 from the battery saving circuit 3 when the power source switch 1 is turned on and then outputs the resulting signal to the ringing signal forming circuit 10.

The delay time τ set at the delay circuit 13 corresponds to the on time of the charge control signal CC output from the battery saving circuit 3 to the waveform shaping circuit 8 when the power source switch 1 is turned on. By the delay operation of the delay circuit 13, the command BC1 is not applied as a ringing signal output command BC1' to the ringing tone signal forming circuit 10 until a time τ has passed after the power source switch 1 is turned on, namely, until the charge control signal CC has fallen to its off state (or to a logical low level). FIGS. 5(d)–(f) illustrate changes with time in the charge control signal CC and ringing signal output commands BC1, BC1', respectively, when the power source switch 1 is turned on.

Figure 3:
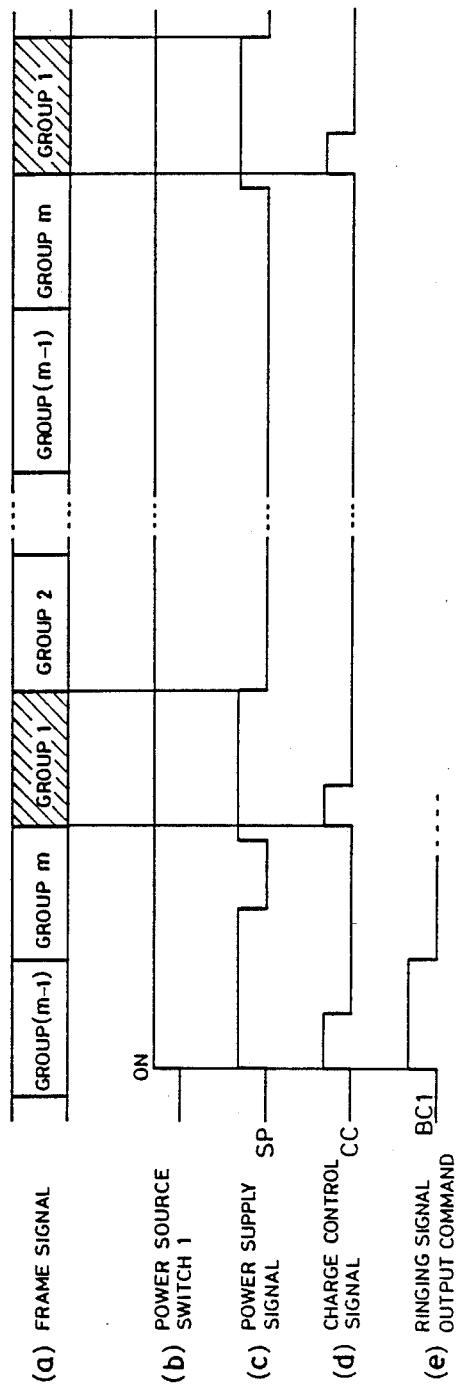

The behavior of the frame signal, power source switch 1 on signal, and power supply signal SP of FIGS. 5(a)–(c), respectively, correspond to those of FIGS. 3(a)–(c). Namely, the intermittent reception following the intermittent power feeding and the ringing or calling operation based on the comparison and check of "individual numbers", etc., apply also in the receiver of this embodiment as in the conventional receiver shown in FIG. 2.

As just described above, according to the receiver shown in FIG. 4, the timing with which the ringing signal output command BC1 is applied to the ringing signal forming circuit 10 is delayed by a time equal to the on time τ of the charge control signal CC, the reference level is set on the basis of the application (turning on) of the charge control signal, and the ringing operation is then performed on the basis of the application (turning on) of the ringing signal output command BC1 (correctly, BC1'). Therefore, a rapid appropriate reference level is set without being influenced by fluctuations of the power source voltage due to the ringing operation. Thus, the contents of the frame signal received by the receiver are accurately transmitted to the receiver from immediately when the power source for the receiver is turned on.

Figure 5:
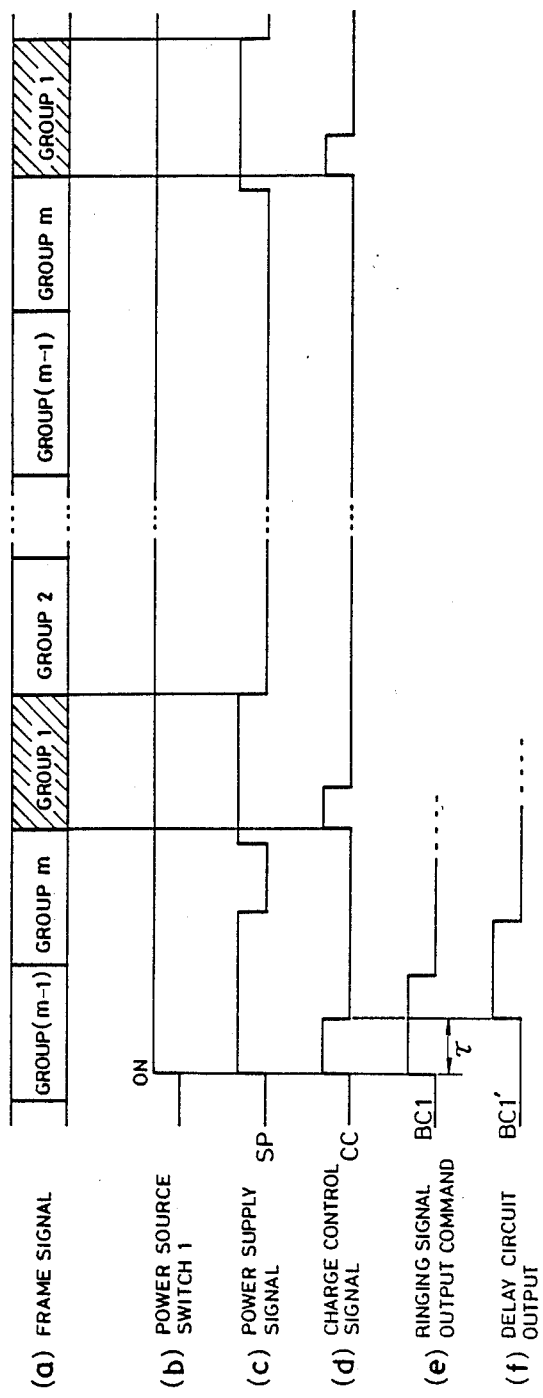

The delay time τ set by the delay circuit 13 is only required to be a time to absorb at least the on time of the charge control signal CC, namely, a time longer than the on time. These times are not required to coincide with each other, as shown in FIG. 5. The actual on time of the charge control signal CC when the power source is turned on is at most about 100–200 milliseconds and the time delay of this extent in the ringing operation does not present a problem at all from the standpoint of a human sensation.

Figure 6:
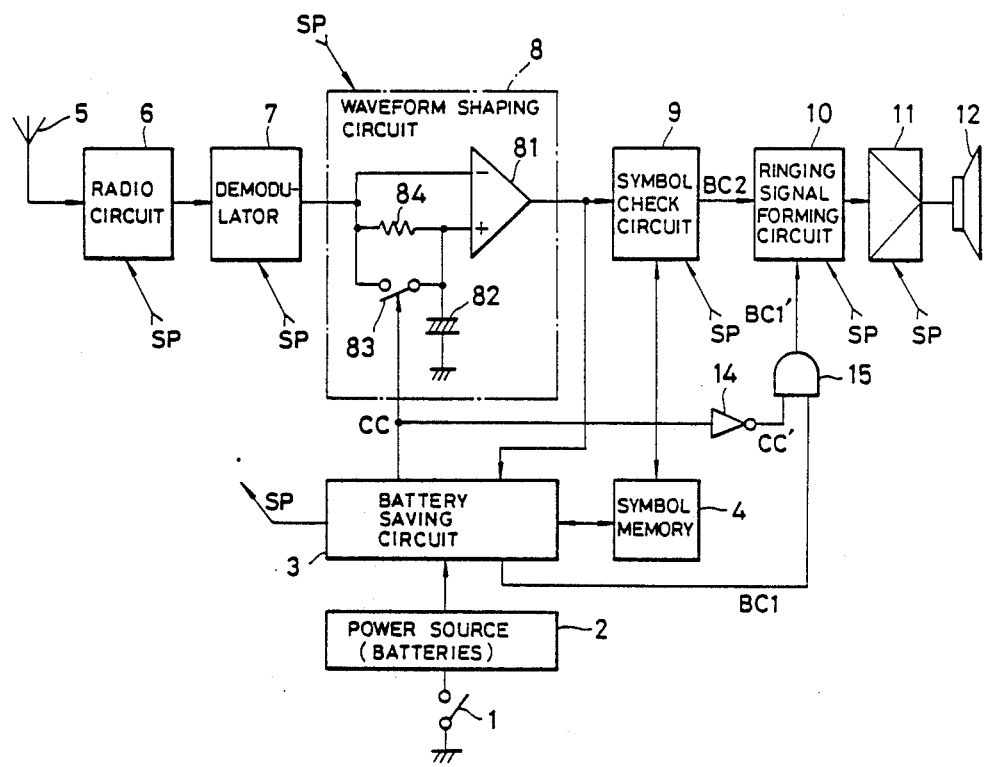
FIG. 6 is a block diagram of another embodiment of the receiver according to the present invention.

FIG. 6 shows another embodiment of the receiver according to the present invention. Also in FIG. 6, the same circuit or element as that in FIG. 2 or FIG. 4 uses the same reference numeral that in FIG. 2 or FIG. 4 to identify itself and duplicate description thereof will be omitted.

As shown in FIG. 6, the receiver of this embodiment furthermore includes an inverter 14 which extracts the charge control signal CC output from the battery saving circuit 3 to the waveform shaping circuit 8 (correctly, an internal switch 83) at least when the power source switch 1 is turned on, and inverts the logical level of the signal CC, and an AND gate 15 which performs an AND operation on the command BC1 output from the saving circuit 3 when the power source switch 1 is turned on and the output CC' from the inverter 14 and applies the resulting signal as the actual ringing tone signal output command BC1' to the ringing signal forming circuit 10.

Namely, in the receiver of FIG. 6, the inverter 14 and AND gate 15 act to inhibit the application of the command BC1 to the ringing signal forming circuit 10 during the on-interval (high logical level) of the charge control signal CC. Also by this embodiment, the command BC1 is not applied as the output command BC1' to the ringing signal forming circuit 10 until the charge control signal CC falls to its off state (its low logical level) after the power source switch 1 is turned on, as in the embodiment of FIG. 4.

FIGS. 7(d)–(g) illustrate changes with time in the charge control signal CC, ringing signal output command BC1, inverter 14 output CC' and AND gate 15 output (ringing signal output command) BC1' after the power source switch is turned on. The frame signal, power source switch 1 on operation signal and power supply signal SP of FIGS. 7(a)–(c) also corresponds in behavior to those of FIGS. 3(a)–(c), respectively. Also in the receiver of this embodiment, the intermittent reception operation following the intermittent power supply of the receiver, the ringing operation based on the comparison and check of the "individual number", etc., are performed as in the receiver of FIG. 2.

As just described above, also in the receiver of FIG. 6, the reference level is set on the basis of the application (turning on) of charge control signal when the power source switch 1 is turned on, and the ringing operation is then performed on the basis of the application (turning on) of the ringing signal output signal BC1 (correctly, BC1'). Therefore, a rapid appropriate reference level is set without being influenced by fluctuations of the power source voltage due to the ringing operation.

While in the respective embodiments the sequence of processing signals has been described on the presumption that the charge control signal CC and ringing signal output command BC1 are simultaneously output from the battery saving circuit 3 when the power source switch 1 is turned on, the delay circuit 13, inverter 14 and AND gate 15 are not required if the battery saving circuit 3 employs a circuit which can beforehand adjust the output timing of the charge control signal CC and ringing tone signal output command BC1 by hardware or by software programming. In that case, the battery saving circuit 3 is constituted such that the charge control signal CC and ringing tone signal output command BC1' are output with the timing, for example, shown in FIGS. 5(d) and (f) or in FIGS. 7(d) and (g) in accordance with the timing which the power source switch 1 is turned on (see FIG. 5(b) or FIG. 7(b)). Of course, the battery saving circuit 3 may be constituted so as to include the delay circuit 13, inverter 14 and AND gate 15.

In the above embodiments, the reference level has been described as being set before the ringing operation. If the ringing tone includes an intermittent tone such as "bleet, bleet, bleet . . . ", the reference level may be set during the time in which the intermittent tone is absent. This causes a ringing tone to be generated without delay compared to the prior art and enables rapid setting of an appropriate reference level.

What is claimed is:

1. A selectively called receiver, comprising:
   means for receiving and demodulating a frame signal transmitted through radio communication, the frame signal including call information;
   means, enabled in response to a charge control signal, for forming a reference level signal based on an average level of at least a portion of the demodulated frame signal;
   means, responsive to a comparison in level between the reference level signal and the demodulated frame signal, for binarizing and shaping the demodulated frame signal into a shaped pulse signal including the call information;
   means, responsive to the shaped pulse signal, for detecting whether the call information indicates the presence of a call to the receiver and for outputting a ringing signal output command if a call to the receiver is detected;
   means, enabled in response to the ringing signal output command and a ringing control signal, for generating a predetermined ringing tone;
   means, responsive to a turning on of a power source switch, for supplying power to the demodulating means, reference level signal forming means, binarizing and shaping means, detecting means, and ringing tone generating means;
   first control means, responsive to the turning on of the power source switch, for monitoring the power source voltage and for outputting the ringing control signal when the power source voltage is above a predetermined value;
   second control means, responsive to the turning on of the power source switch, for outputting the charge control signal; and
   third control means, responsive to a receipt of at least one of the charge control and ringing control signals, for preventing simultaneous enabling of the reference level signal forming means in response to the charge control signal and the ringing tone generating means in response to the ringing control signal.

2. A selectively called receiver according to claim 1, wherein:
   the reference level signal forming means includes a capacitor for holding the reference level signal; and
   the capacitor is rapidly charged and discharged in response to the portion of the demodulated frame signal.

3. A selectively called receiver according to claim 2, wherein:
   the second control means outputs the charge control signal for a predetermined time duration; and
   the third control means comprises a delay circuit which receives and delays the ringing control signal by a delay period at least as long as the predetermined time duration.

4. A selectively called receiver according to claim 2, wherein the third control means comprises a logic circuit which:
   receives the ringing control and the charge control signals, and
   inhibits the ringing control signal from enabling the ringing tone generating means at least during an interval when the charge control signal is enabling the reference level signal forming means.

5. A selectively called receiver, comprising:
   means for receiving and demodulating a frame signal transmitted through radio communication, the frame signal including call information;
   means, including a capacitor and enabled in response to a charge control signal, for forming a reference level signal based on an average level of at least a portion of the demodulated frame signal by rapidly charging and discharging the capacitor in response to the portion of the demodulated frame signal;
   means, responsive to a comparison in level between the reference level signal and the demodulated frame signal, for binarizing and shaping the demodulated frame signal into a shaped pulse signal including the call information;
   means, responsive to the shaped pulse signal, for detecting whether the call information indicates the presence of a call to the receiver and for outputting a ringing signal output command if a call to the receiver is detected;
   means, enabled in response to the ringing signal output command and a ringing control signal, for generating a predetermined ringing tone;
   means, responsive to a turning on of a power source switch, for supplying power to the demodulating means, reference level signal forming means, binarizing and shaping means, detecting means, and ringing tone generating means;
   first control means, responsive to the turning on of the power source switch, for monitoring the power source voltage and for outputting the ringing control signal when the power source voltage is above a predetermined value;
   second control means, responsive to the turning on of the power source switch, for outputting the charge control signal for a predetermined time duration; and
   third control means, including a delay circuit, for receiving and delaying the ringing control signal for a delay period at least as long as the predetermined time duration.

6. A selectively called receiver, comprising:
   means for receiving and demodulating a frame signal transmitted through radio communication, the frame signal including call information;
   means, including a capacitor and enabled in response to a charge control signal, for forming a reference level signal based on an average level of at least a portion of the demodulated frame signal by rapidly charging and discharging the capacitor in response to the portion of the demodulated frame signal;
   means, responsive to a comparison in level between the reference level signal and the demodulated frame signal, for binarizing and shaping the demodulated frame signal into a shaped pulse signal including the call information;
   means, responsive to the shaped pulse signal, for detecting whether the call information indicates the presence of a call to the receiver and for outputting a ringing signal output command if a call to the receiver is detected;
   means, enabled in response to the ringing signal output command and a ringing control signal, for generating a predetermined ringing tone;
   means, responsive to a turning on of a power source switch, for supplying power to the demodulating means, reference level signal forming means, binarizing and shaping means, detecting means, and ringing tone generating means;

first control means, responsive to the turning on of the power source switch, for monitoring the power source voltage and for outputting the ringing control signal when the power source voltage is above a predetermined value;

second control means, responsive to the turning on of the power source switch, for outputting the charge control signal for a predetermined time duration; and third control means, including a logic circuit, for receiving the ringing control and the charge control signals, and inhibiting the ringing control signal from enabling the ringing tone generating means at least during an interval when the charge control signal is enabling the reference level signal forming means.

* * * * *